(12) United States Patent
Suzuki et al.

(10) Patent No.: US 7,534,369 B2
(45) Date of Patent: May 19, 2009

(54) METHOD OF PRODUCING LIQUID CRYSTAL EMULSION COMPOSITIONS

(75) Inventors: Takashi Suzuki, Yokohama (JP); Kenji Nakamura, 3-41, Nishiawaji 6-chome, Higashi Yodogawa-ku, Osaka-shi, Osaka (JP)

(73) Assignee: Kenji Nakamura, Osaka (JP)

( * ) Notice: Subject to any disclaimer, the term of this patent is extended or adjusted under 35 U.S.C. 154(b) by 219 days.

(21) Appl. No.: 11/560,291

(22) Filed: Nov. 15, 2006

(65) Prior Publication Data
US 2007/0145330 A1  Jun. 28, 2007

(30) Foreign Application Priority Data
Dec. 22, 2005  (JP) .............................. 2005-369052

(51) Int. Cl.
*C09K 19/00* (2006.01)
*C09K 19/56* (2006.01)
*G03C 5/18* (2006.01)
*G03C 5/26* (2006.01)

(52) U.S. Cl. .............................. 252/299.01; 252/299.6; 516/72; 516/76; 430/449; 430/450

(58) Field of Classification Search ............ 252/299.01, 252/299.6; 430/449–450; 516/72, 76
See application file for complete search history.

(56) References Cited

U.S. PATENT DOCUMENTS 4,781,849 A  11/1988  Biresaw et al.

2005/0039253 A1  2/2005  Yang et al.
2007/0149624 A1*  6/2007  Suzuki et al. ................ 516/76

FOREIGN PATENT DOCUMENTS

| EP | 0 418 986 A2 | 3/1991 |
|---|---|---|
| JP | 63-287718 | 11/1988 |
| JP | 04-224507 | 8/1992 |
| JP | 08-217633 | 8/1996 |
| JP | 09-124432 | 5/1997 |
| JP | 2003-212716 | 7/2003 |

OTHER PUBLICATIONS

C. Stubenrauch, et al., "A new approach to lamellar phases (Lα) in water—non-ionic surfactant systems," Liquid Crystals, vol. 31, No. 1, Jan. 2004, pp. 39-53.
A Machine translation of Japanese Patent No. 2003/212716.

* cited by examiner

*Primary Examiner*—Geraldina Visconti
(74) *Attorney, Agent, or Firm*—Knobbe, Martens, Olson & Bear LLP

(57) ABSTRACT

A method of producing a liquid crystal emulsion composition which has a viscosity of 30,000 mPa·sec or more at a 2-hold dilution and an improved stability, includes admixing a hydrophilic surfactant which is a polyoxyethylene polyoxypropylene alkyl ether having an HLB of 10 to 20 with a hydrophilic surfactant having an HLB of 13 or more which is comprised of a polyoxyethylene fatty acid derivative; admixing the resulting admixture with a mixture of 5 to 10 parts by weight of the thus combined surfactants with 5 to 30 parts by weight of an oil component; admixing the resulting admixture with a mixture of 40 to 80 parts by weight of a water-soluble polyvalent alcohol and 8 to 40 parts by weight of water; and heating, homogeneously mixing and then cooling the thus obtained admixture.

16 Claims, No Drawings

METHOD OF PRODUCING LIQUID CRYSTAL EMULSION COMPOSITIONS

BACKGROUND OF THE INVENTION

1. Field of the Invention

The present invention relates to a method of producing a highly viscous, hard liquid crystal emulsion composition, in which stability of liquid crystals is improved so that the liquid crystal structure is not destroyed by dilution, with ease without applying shear force.

More specifically, the present invention relates to a method of producing a hard liquid crystal emulsion composition having an excellent stability and a viscosity 30,000 mPa·sec or more at a 2-fold dilution by using two kinds of hydrophilic surfactants having specific molecular structures with which specific components are admixed in specific mixing ratios.

2. Description of the Related Art

Conventionally, liquid crystallization using ceramides, glyceryl phospholipids, and the like has been known as in Japanese Patent Laid-open No. 124432/1997 (Patent Reference No. 1) and Japanese Patent Laid-open No. 217633/1996 (Patent Reference No. 2); however, little research has been done on liquid crystals using nonionic surfactants. Since the liquid crystal structure with the use of higher alcohols is extremely unstable and has many disadvantages, the admixing of oil components which are solid at room temperature such as paraffin and Vaseline, while reducing the admixing ratio of higher alcohols, and the use of water-soluble polymers such as gum arabic, carboxyvinyl polymers, and hydroxypropyl cellulose have been proposed to solve these disadvantages. However, the resulting products are clouded, lose transparency that is unique to liquid crystals or have increased stickiness and lack the clean texture of liquid crystals. On the other hand, Japanese Patent Laid-open No. 287718/1988 (Patent Reference No. 3) has proposed liquid crystal base materials for external application, which are composed of higher alcohols, fatty acids, hydrophilic surfactants, lipophilic surfactants, polyvalent alcohols, and water. This technique is to obtain liquid crystals by applying stirring shock using a Manton Gaulin homogenizer.

As the hydrophilic surfactants, decaglyceryl fatty acid esters, POE addition polyethylene glycol fatty acid esters, or POE addition hydrogenated castor oil have been used; however, they are not suitable for stable liquid crystal formation although they are well emulsified. As the lipophilic surfactants, fatty acid glycerides having an HLB of 7 or less have been used. The process of the production is complicated, in which oil phase components and water phase components are separately admixed and heated and the oil phase components are added to the water phase components to be pretreated using a homomixer, after which high shear force is applied by a Monton Gaulin or Manton Gaulin homogenizer. The liquid crystal structure is destroyed by dilution with water or the like to form white micelles due to the weakness of the interface membrane strength of the liquid crystals, which results in the formation of poorly stable liquid crystals.

According to Japanese Patent Laid-open No. 212716/2003 (Patent Reference No. 4), an improved liquid crystal emulsion composition composed of oil components, higher alcohols, higher fatty acids, hydrophilic surfactants, lipophilic surfactants, water-soluble polyvalent alcohols, and water has been proposed. The liquid crystals are formed by setting the amount of oily components (oil components+higher alcohols+higher fatty acids) to from 0.5 to 15.0% by weight, the ratio of the oil components to nonionic surfactants to from 1:1 to 3:1, and the number of carbon atoms of the higher alcohols to from 12 to 24 and applying stirring shock. More specifically, liquid crystals can be obtained only by a complicated process applying high shear force using a homomixer and then a Manton Gaulin homogenizer or a Microfluidizer. Further, the resulting liquid crystals are poorly stabile since the liquid crystal structure is destroyed by dilution with water or the like to change the liquid crystals from the transparent state to the state of opaque micelle emulsion.

SUMMARY OF THE INVENTION

With the advance of microdispersion technology owing to the development of powerful shear forces, emulsification technology has made an achievement, finding surfactants suitable for stirring shock.

By applying the idea of emulsification technology, a fair achievement has been made also in liquid crystallization by setting surfactants suitable for a production process to use shear force; however, in such a system, specific equipment such as a Manton Gaulin homogenizer or a Microfluidizer is required and liquid crystals cannot be formed unless temperature impact or stirring shock is applied, which disadvantageously results in high cost. Further, in terms of quality, there are problems in stability of liquid crystals such that fine micelles are intermingled to make the liquid crystals clouded or that liquid crystals are destroyed by dilution to generate white micelles.

An object of the present invention is to solve the abovementioned problems by streamlining the production process for cost reduction and at the same time by improving qualitative stability.

In emulsification, it is assumed that there is difference between the degree of hydrophilicity and lipophilicity of surfactants which are effective in reducing the surface tension of fine droplet micelles and the degree of hydrophilicity and lipophilicity of surfactants which are necessary to obtain the strength of interface membrane by aligning liquid crystals on the lamellar surface. Accordingly, the degree of hydrophilicity and lipophilicity of surfactants which are effective in improving the stability of liquid crystals has been studied. As a result, the streamlining of production process and the qualitative improvement have been accomplished by using surfactants having an extremely high hydrophilicity, which are specified by their molecular structures, and thus the problems have been solved.

Conventionally, in terms of the viscosity of liquid crystal emulsion compositions, no hard liquid crystal emulsion composition having a viscosity higher than 20,000 mPa·sec at a 2-fold dilution has been obtained.

Another object of the present invention is to solve the abovementioned problems by streamlining the production process for cost reduction and at the same time by improving qualitative stability and realizing high viscosity.

In liquid crystal emulsification, stable liquid crystal emulsion compositions have been easily obtained using a polyoxyethylene polypropylene alkyl ether as a hydrophilic surfactant. However, the maximum viscosity of the resulting product has been 20,000 mPa·sec at a 2-fold dilution and cream having a viscosity higher than this limit has not been obtainable.

An embodiment has solved the problems and enabled the production of a highly viscous liquid crystal emulsion composition by further admixing hydrophilic surfactants having specific molecular structures.

An embodiment solved the abovementioned problems based on the following constituents.

[1] A process of producing a liquid crystal emulsion composition, comprising the steps of (1) admixing 3 to 6 parts by weight of a hydrophilic surfactant (a) having an HLB of 10 to 20 which is selected from polyoxyethylene polyoxypropylene alkyl ethers of general formula $HO(C_2H_4O)_n-(C_3H_6O)_mR$, wherein n is 15 to 50, m is 4 to 16 and R is an alkyl group having 12 to 24 carbon atoms, with 3 to 6 parts by weight of one or more kinds of hydrophilic surfactants (b) having an HLB of 13 or more which are selected from polyoxyethylene fatty acid derivatives comprising a polyoxyethylene group $(C_2H_4O)_n$ wherein n is 15 to 50 and an alkyl group wherein the number of carbon atoms is 15 to 24; (2) admixing the resulting admixture with 2 to 5 parts by weight of a lipophilic surfactant (c); (3) admixing 8 to 17 parts by weight of the resulting admixture with 5 to 26 parts of an oil component (d); (4) admixing the previously obtained admixture with a mixture obtained by mixing 40 to 80 parts by weight of a water-soluble polyvalent alcohol and 8 to 40 parts by weight of water (f); (5) heating and homogeneously mixing the thus obtained admixture; and (6) cooling the resulting product.

[2] The process of producing a liquid crystal emulsion composition of [1], characterized in that a polyoxyethylene phytosterol or its hydrogenated derivative, and/or a polyoxyethylene cholesterol or its hydrogenated derivative is added to the abovementioned surfactants (b).

[3] The process of producing a liquid crystal emulsion composition according to [1] or [2], characterized in that the mixing ratio of the oil component (d) and the admixture of the surfactants ((a)+(b)+(c)) is from 1:1 to 3:1.

[4] The process of producing a liquid crystal emulsion composition according to [1], [2] or [3], characterized in that the water-soluble polyvalent alcohol content in the admixture of the water-soluble polyvalent alcohol (e) and water (f) is 60 to 90% by weight.

[5] The liquid crystal emulsion composition according to any one of [1] to [4], characterized in that the liquid crystal emulsion composition produced by the method of the abovementioned [1] or [2] is further diluted with water, a water/lower monovalent alcohol solution, or a water/water-soluble polyvalent alcohol solution.

For purposes of summarizing the invention and the advantages achieved over the related art, certain objects and advantages of the invention are described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In the present disclosure where conditions and/or structures are not specified, the skilled artisan in the art can readily provide such conditions and/or structures, in view of the present disclosure, as a matter of routine experimentation.

Further aspects, features and advantages of this invention will become apparent from the detailed description of the preferred embodiments which follow.

DETAILED DESCRIPTION OF THE PREFERRED EMBODIMENT

As mentioned above, an embodiment is characterized by the production method to obtain highly viscous and stable liquid crystals by fortifying a wedge effect of surfactants on liquid crystal formation in the liquid phase and water phase of the surfactants.

The hydrophilic surfactant (a) used in an embodiment is a hydrophilic surfactant having an HLB of 10 to 20 selected from polyoxyethylene (POE) polyoxypropylene (POP) alkyl ethers, comprising $(POE)_n$, wherein n is 15 to 50, $(POP)_m$, wherein m is 4 to 16, and a $C_{12}$ to $C_{24}$ alkyl group.

Specific examples of the abovementioned hydrophilic surfactant (a) to be used include polyoxyethylene (20) polyoxypropylene (4) cetyl ether (HLB 16.5), polyoxyethylene (20) polyoxypropylene (8) cetyl ether (HLB 12.5), polyoxyethylene (20) polyoxypropylene (6) decyltetradecyl ether (HLB 11), and polyoxyethylene (30) polyoxypropylene (6) decyltetradecyl ether (HLB 12).

The other hydrophilic surfactant (b) to be used is a hydrophilic surfactant having a HLB of 13 or more which is selected from polyoxyethylene fatty acid derivatives comprising a poly $(POE)_n$ group, wherein n is 15 to 60, and an alkyl group, wherein the number of carbon atoms is 15 to 24, including polyoxyethylene alkyl ethers, polyoxyethylene sorbitan fatty acid esters, polyoxyethylene hydrogenated castor oil, and polyoxyethylene glycerin fatty acid esters.

Specific examples of the abovementioned hydrophilic surfactant (b) to be used include POE (30) cetyl ether (HLB 19.5), POE (40) cetyl ether (HLB 20.0), and POE (30) behenyl ether (HLB 18.0) as a polyoxyethylene alkylene ether; POE (20) sorbitan stearate (HLB 15.6), POE (20) sorbitan oleate (HLB 15.0), and POE (20) sorbitan palmitate (HLB 15.6) as a polyoxyethylene sorbitan fatty acid ester; POE (80) castor oil (HLB 15.0) as polyoxyethylene hydrogenated castor oil; and POE (15) glyceryl stearate (HLB 13.5), POE (15) glyceryl oleate (HLB 13.5), and POE (15) glyceryl oleate (HLB 14.5) as a polyoxyethylene glycerin fatty acid ester.

Further, it is also possible to use polyoxyethylene phytosterols such as POE (20) phytosterol (HLB 15.5), POE (30) phytosterol (HLB 18.0), and POE (25) phytostanol (HLB 14.5) or their hydrogenated derivatives and polyoxyethylene cholesterols such as POE (30) cholestanol (HLB 17.0) and their hydrogenated derivatives, as the abovementioned hydrophilic surfactant (b).

Liquid crystals can be obtained using the abovementioned hydrophilic surfactant (a); however, hard liquid crystals having a viscosity of 30,000 mPa·sec or more at a 2-fold dilution cannot be obtained. With the use of (b) alone, a liquid crystal emulsion composition cannot be obtained solely by mixing homogeneously because shear force is required for liquid crystal formation.

The lipophilic surfactant (c) to be used has an HLB of 5 or less and can be selected from glyceryl monostearate, propylene glycol fatty acid esters, glycerin fatty acid esters, polyoxyethylene glycerin fatty acid esters, sorbitan fatty acid esters, sorbitol fatty acid esters, polyoxyethylene sorbitol fatty acid esters, and polyethylene glycol fatty acid esters.

Examples of the oil component (d) include (1) cholesteryl stearate, diglyceryl stearate, glyceryl tristearate, chimyl stearate, beeswax, higher alcohols, batyl alcohol, and hydroxystearic acid as a solid oil component; (2) latherin, hydrogenated castor oil stearate, hydrogenated Jojoba oil, glyceryl tricapryl-caprinate, and glyceryl triglycerate as a semisolid oil component; and (3) squalane oil, silicone oil, liquid paraffin, isopropyl myristate, Jojoba oil, olive oil, Macadamia nut oil, synthetic isoparaffin, diisopropyl adipate, glyceryl tri-2-ethylhexanoate, octyldodecyl myristate, and cetostearyl alcohol as a fluid oil component. These components are appropriately mixed for use.

Examples of the water-soluble polyvalent alcohol (e) to be used include glycerin, diglycerin, polyglycerin, propylene glycol, dipropylene glycol, 1,3-butylene glycol, 1,4-butylene glycol, triethylene glycol, polyethylene glycol, sorbitol, xylitol, glucose, and maltitol.

First, 5 to 30 parts by weight of an oil component and 5 to 10 parts by weight of surfactants (hydrophilic (a)+hydrophilic (b)+lipophilic (c)) are mixed in a ratio of from 1:1 to 3:1 and the resulting mixture is heated to and maintained at 70° C. The mixing ratio of hydrophilic surfactants ((a)+(b)) and lipophilic surfactants (c) is, but not limited to, from 1:1 to 2:1. Next, 8 to 40 parts by weight of water (f) and 40 to 80 parts by weight of water-soluble polyvalent alcohol (e) are mixed and the resulting mixture is heated to and maintained at 70° C. The amount of the water-soluble polyvalent alcohol (e) in the water phase is 60 to 90% by weight. The water phase component and the oil phase component are combined and the temperature is lowered from 70° C. to about 45° C., which enables the production of a viscous, apparently transparent liquid crystal emulsion composition.

As the oil component (d), any of the solid oil component, semisolid oil component and fluid oil component can be used; however, liquid crystal formation is often difficult with the use of the fluid oil component alone and thus it is preferable to use the three components in combination. When the oil phase components are poorly miscible, the solid oil component may crystallize with time and destroy the structure of liquid crystals.

An embodiment characteristically provides a method of producing a highly viscous, hard liquid crystal emulsion composition. Further, in the resulting product, the structure of liquid crystals is not destroyed when diluted with water, a water/lower monovalent alcohol solution or a water/water-soluble polyvalent alcohol solution and thus the state of dispersion of liquid crystals can be characteristically maintained. With conventional technology, such stability cannot be obtained because the liquid crystals are destroyed upon dilution, which causes cloudiness. Conventional emulsified products are white and cause whitening upon application on the skin and the white color inevitably remains for long on the surface of the skin, whereas the liquid crystal emulsion composition according to an embodiment is an apparently transparent cream and causes no whitening. The cream is hard and has a viscosity of 30,000 mPa·sec or more at a 2-fold dilution. It has no "stickiness" like emulsified cream. It is characterized by its fresh and clean feeling and an excellent long lasting effect in maintaining the moisture of the skin.

Since liquid crystals show optical anisotropy, liquid crystal formation is confirmed by polarization microscopy. Formation of emulsified particles other than liquid crystals is confirmed by phase contrast microscopy.

Methods of an embodiment will be explained more in detail by the following examples.

However, these examples are not intended to limit the present invention.

EXAMPLES

TABLE 1

| Ingredient | Component | Ex. 1 | Ex. 2 | Ex. 3 | Ex. 4 | Ex. 5 | Ex. 6 | Ex. 7 |
|---|---|---|---|---|---|---|---|---|
| Hydrophilic surfactant (a) | (1) PBC-34 | 4.0% wt | 4.0% wt | 3.0% wt | 3.0% wt | — % wt | — % wt | — % wt |
| | (2) PEN-4630 | — | — | — | — | 4.0 | 3.0 | 3.0 |
| Hydrophilic surfactant (b) | (1) BB-30 | 3.0 | — | 2.0 | — | 3.0 | 2.0 | — |
| | (2) TI-10 | — | 3.0 | — | 2.0 | — | 2.0 | — |
| | (3) HCO-40 | — | — | 2.0 | — | — | — | 2.0 |
| | (4) TMGS-15 | — | — | — | 2.0 | — | — | 2.0 |
| Lipophilic surfactant (c) | (1) MGS-B | 3.0 | 3.0 | 3.0 | 3.0 | 3.0 | 3.0 | 3.0 |
| Oil component (d) | (1) TIO | 4.0 | 4.0 | 4.0 | 4.0 | 4.0 | 4.0 | 4.0 |
| | (2) Vaseline | 3.0 | 3.0 | 3.0 | 3.0 | 3.0 | 3.0 | 3.0 |
| | (3) Squalane | 4.0 | 4.0 | 4.0 | 4.0 | 4.0 | 4.0 | 4.0 |
| | (4) STA | 5.0 | 5.0 | 5.0 | 5.0 | 5.0 | 5.0 | 5.0 |
| | (5) Hydroxy stearic acid | 2.0 | 2.0 | 2.0 | 2.0 | 2.0 | 2.0 | 2.0 |
| | Total | 18.0 | 18.0 | 18.0 | 18.0 | 18.0 | 18.0 | 18.0 |
| Water-soluble polyvalent alcohol (e) | (1) Glycerin | 33.0 | 33.0 | 33.0 | 33.0 | 33.0 | 33.0 | 33.0 |
| | (2) 1,3 BG | 21.0 | 21.0 | 21.0 | 21.0 | 21.0 | 21.0 | 21.0 |
| | Concentration in water phase | 75% wt | 75% wt | 75% wt | 75% wt | 75% wt | 75% wt | 75% wt |
| Water (f) | Purified water | 18.0 | 18.0 | 18.0 | 18.0 | 18.0 | 18.0 | 18.0 |
| Characters At a 2-fold dilution with purified water | Appearance | | | Apparently transparent cream | | | | |
| | Phase contract microscopy | — | — | | | | — | — |
| | Polarization microscopy | | | All liquid crystals | | | | |
| | Viscosity, mPa·sec | 32,000 | 32,000 | 33,000 | 33,000 | 32,000 | 33,000 | 33,000 |

| | | | Comparative example | | | | | |
|---|---|---|---|---|---|---|---|---|
| Group | Component | Ex. 8 | 1 | 2 | 3 | 4 | 5 | 6 |
| Hydrophilic surfactant (a) | (1) PBC-34 | — | 6.0 | — | — | — | — | — |
| | (2) PEN-4630 | 4.0 | — | 6.0 | — | — | — | — |
| Hydrophilic | (1) BB-30 | — | — | — | 6.0 | — | — | — |

TABLE 1-continued

| | | | | | | | | |
|---|---|---|---|---|---|---|---|---|
| surfactant (b) | (2) TI-10 | — | — | — | — | 6.0 | — | — |
| | (3) HCO-40 | — | — | — | — | — | 6.0 | — |
| | (4) TMGS-15 | 3.0 | — | — | — | — | — | 6.0 |
| Lipophilic surfactant (c) | (1) MGS-B | 4.0 | 4.0 | 4.0 | 4.0 | 4.0 | 4.0 | 4.0 |
| Oil component (d) | (1) TIO | 4.0 | 4.0 | 4.0 | 4.0 | 4.0 | 4.0 | 4.0 |
| | (2) Vaseline | 3.0 | 3.0 | 3.0 | 3.0 | 3.0 | 3.0 | 3.0 |
| | (3) Squalane | 4.0 | 4.0 | 4.0 | 4.0 | 4.0 | 4.0 | 4.0 |
| | (4) STA | 5.0 | 5.0 | 5.0 | 5.0 | 5.0 | 5.0 | 5.0 |
| | (5) Hydroxy stearic acid | 2.0 | 2.0 | 2.0 | 2.0 | 2.0 | 2.0 | 2.0 |
| | Total | 18.0 | 18.0 | 18.0 | 18.0 | 18.0 | 18.0 | 18.0 |
| Water-soluble polyvalent alcohol (e) | (1) Glycerin | 33.0 | 33.0 | 33.0 | 33.0 | 33.0 | 33.0 | 33.0 |
| | (2) 1,3 BG | 21.0 | 21.0 | 21.0 | 21.0 | 21.0 | 21.0 | 21.0 |
| | Concentration in water phase | 75% wt | 75% wt | 75% wt | 75% wt | 75% wt | 75% wt | 75% wt |
| Water (f) | Purified water | 18.0 | 18.0 | 18.0 | 18.0 | 18.0 | 18.0 | 18.0 |
| Characters | | | | | | | | |
| At a 2-fold dilution with purified water | Appearance | Apparently transparent cream | | | Milky white cream | | | |
| | Phase contract microscopy | — | — | — | Emulsified particles 0.2 to 0.5 μ | | | |
| | Polarization microscopy | All liquid crystals | | | A small quantity of liquid crystals | | | |
| | Viscosity, mPa·sec | 32,000 | 19,000 | 20,000 | 19,000 | 19,000 | 18,000 | 19,000 |

The figures in the table are in percent by weight.

The hydrophilic surfactants (a) used in examples were (1) PBC-34 (Nikkol PBC-34, a product of Nikko Chemicals Co., Ltd.): polyoxyethylene (20) polyoxypropylene (4) cetyl ether (HLB 16.5); and (2) PEN-4630 (Nikkol PEN-4630, a product of Nikko Chemicals Co., Ltd.): polyoxyethylene (30) polyoxypropylene (6) decyltetradecyl ether.

The hydrophilic surfactants (b) used in examples were (1) BB-30 (Nikkol BB-30, a product of Nikko Chemicals Co., Ltd.): polyoxyethylene (30) behenyl ether (HLB 18.0); (2) TI-10 (Nikkol TI-10, a product of Nikko Chemicals Co., Ltd.): POE (20) sorbitan isostearate (HLB 15.0); (3) HCO-40 (Nikkol HCO-40, a product of Nikko Chemicals, Co., Ltd.): POE (40) hydrogenated castor oil (HLB 12.5); and (4) TMGS-15 (Nikkol TMGS-15, a product of Nikko Chemicals Co., Ltd.): POE (15) glyceryl stearate (HLB 13.5).

The lipophilic surfactant (c) used was MGS-B (Nikkol MGS-B, a product of Nikko Chemicals Co., Ltd.): glycerin monostearate (HLB 3.0).

In the oil component (d), "TIO" is glyceryl tri-2-ethylhexanoate and "STA" is cetostearyl alcohol; Vaseline and squalane were also used as the oil component.

The water-soluble polyvalent alcohols (e) used were glycerin and 1,3 BG (butylene glycol).

According to the combination shown in Table 1, the surfactants (hydrophilic (a)+hydrophilic (b)+lipophilic (c)) and the oil components were admixed and the resulting admixture was heated to and maintained at 70° C. Further, water-soluble polyvalent alcohol and water were mixed and the resulting mixture was heated to and maintained at 70° C. Both mixtures were combined and cooled to 45° C. to obtain individual liquid crystal compositions.

In Examples 1 to 8, the compositions were apparently transparent creams and were entirely composed of liquid crystals having a viscosity of 30,000 mPa·sec or more at a 2-fold dilution. In contrast, in Comparative Examples 1 and 2, the compositions were apparently transparent creams and liquid crystals were formed, but they were not hard having a viscosity of 20,000 mPa·sec at a 2-fold dilution. In Comparative Examples 4, 5 and 6 in which no hydrophilic surfactant (a) was used, the resulting compositions were white creams and were mainly composed of emulsified particles of 0.2 to 0.5 μm and only a small amount of liquid crystals were formed.

The phase region in which an oil phase component and a water phase component form liquid crystals is determined by the state of the oil phase-water phase-surfactant component system and the mixing ratio of the oil component, and the surfactants depends on the phase region, which ranges from 1:1 to 3:1; therefore, liquid crystal emulsification has to be done in this range. No liquid crystal is formed in any range other than this. The mixing ratio was set within this range, i.e., 1.8:1, in both Examples and Comparative Examples. It is also important to set the water-soluble polyvalent alcohol content in the water phase to be 60 to 90% by weight since no liquid crystal is formed in any range other than this. Said content was set to be 75% by weight in both Examples and Comparative Examples.

There is a certain combination of components that shows the liquid crystal region from the phase condition of the component system and setting this combination is a prerequisite. An embodiment is characterized in that highly stable and highly viscous liquid crystals can be easily obtained by admixing surfactants (a) and (b) in combination without applying shear force.

Conventional liquid crystal compositions have a problem that liquid crystals are destroyed and turn into white emulsified particles when diluted with water, a water/lower monovalent alcohol solution, or a water/water-soluble polyvalent alcohol solution since the liquid crystals are poorly stable.

In an attempt to solve this problem using polyoxyethylene polyoxypropylene alkyl ethers, stable liquid crystals have been obtained but the resulting cream has been poorly viscous having a maximum viscosity of 20,000 mPa·sec at a 2-fold dilution.

According to an embodiment, a hard and highly viscous liquid crystal emulsion composition having a viscosity of 30,000 mPa·sec or more at a 2-fold dilution can be obtained. Further, it has been shown that owing to excellent stability, liquid crystal structure is not destroyed and thus no white emulsified particle is formed upon dilution with water, a water/lower monovalent alcohol solution, or water/water-soluble polyvalent alcohol solution.

The present application claims priority to Japanese Patent Application No. 2005-369052, filed Dec. 22, 2005, the disclosure of which is incorporated herein by reference in their entirety.

What is claimed is:

1. A method of producing a liquid crystal emulsion composition, comprising the steps of:
 (i) admixing 3 to 6 parts by weight of a hydrophilic surfactant A having an HLB of 10 to 20 which is selected from polyoxyethylene polyoxypropylene alkyl ethers of general formula $HO(C_2H_4O)_n-(C_3H_6O)_mR$, wherein n is 15 to 50, m is 4 to 16, and R is an alkyl group having 12 to 24 carbon atoms, with 3 to 6 parts by weight of at least one kind of hydrophilic surfactant B having an HLB of 13 or more which is selected from polyoxyethylene fatty acid derivatives comprising a polyoxyethylene group $(C_2H_4O)_n$, wherein n is 15 to 50, and an alkyl group, wherein the number of carbon atoms is 5 to 24;
 (ii) admixing the resulting admixture obtained in step (i) with 2 to 5 parts by weight of a lipophilic surfactant C;
 (iii) admixing 8 to 17 parts by weight of the resulting mixture obtained from step (ii) with 5 to 26 parts of an oil component D;
 (iv) admixing the resulting admixture obtained from step (iii) with a mixture obtained by mixing 40 to 80 parts by weight of a water-soluble polyvalent alcohol E and 8 to 40 parts by weight of water F;
 (v) heating and homogeneously mixing the resulting admixture obtained from step (iv); and
 (vi) cooling the resulting product obtained in step (v).

2. The method according to claim 1, wherein the surfactant B further comprises a polyoxyethylene phytosterol or its hydrogenated derivative, and/or a polyoxyethylene cholesterol or its hydrogenated derivative.

3. The method according to claim 1, wherein a mixing ratio of the oil component D to the admixture of the surfactants A, B, and C is from 1/1 to 3/1.

4. The method according to claim 2, wherein a mixing ratio of the oil component D to the admixture of the surfactants A, B, and C is from 1/1 to 3/1.

5. The method according to claim 1, wherein a water-soluble polyvalent alcohol content in the admixture of the water-soluble polyvalent alcohol E and the water F is 60% to 90% by weight.

6. The method according to claim 2, wherein a water-soluble polyvalent alcohol content in the admixture of the water-soluble polyvalent alcohol E and the water F is 60% to 90% by weight.

7. The method according to claim 3, wherein a water-soluble polyvalent alcohol content in the admixture of the water-soluble polyvalent alcohol E and the water F is 60% to 90% by weight.

8. The method according to claim 4, wherein a water-soluble polyvalent alcohol content in the admixture of the water-soluble polyvalent alcohol B and the water F is 60% to 90% by weight.

9. The method according to claim 1, wherein a mixing ratio of the hydrophilic surfactants A and B to the lipophilic surfactant C is from 1/1 to 2/1.

10. A diluted liquid crystal emulsion composition comprising:
 the liquid crystal emulsion composition obtained by claim 1; and
 a diluent which is water, a solution containing water and lower monovalent alcohol, or a solution containing water and water-soluble polyvalent alcohol, wherein the liquid crystal emulsion composition is diluted with the diluent.

11. The diluted liquid crystal emulsion composition according to claim 10, wherein the surfactant B further comprises a polyoxyethylene phytosterol or its hydrogenated derivative, and/or a polyoxyethylene cholesterol or its hydrogenated derivative.

12. The diluted liquid crystal emulsion composition according to claim 10, wherein a mixing ratio of the oil component D to the admixture of the surfactants A, B, and C is from 1/1 to 3/1.

13. The diluted liquid crystal emulsion composition according to claim 10, wherein a water-soluble polyvalent alcohol content in the admixture of the water-soluble polyvalent alcohol B and the water F is 60% to 90% by weight.

14. The diluted liquid crystal emulsion composition according to claim 10, wherein a mixing ratio of the hydrophilic surfactants A and B to the lipophilic surfactant C is from 1/1 to 2/1.

15. The diluted liquid crystal emulsion composition according to claims 10, which has a viscosity of 30,000 mPa·sec or higher at a 2-fold dilution.

16. The diluted liquid crystal emulsion composition according to claims 10, wherein the liquid crystal emulsion maintains a liquid crystal structure, and substantially no white emulsified particle is formed therein.

* * * * *

UNITED STATES PATENT AND TRADEMARK OFFICE
CERTIFICATE OF CORRECTION

PATENT NO. : 7,534,369 B2 Page 1 of 1
APPLICATION NO. : 11/560291
DATED : May 19, 2009
INVENTOR(S) : Takashi Suzuki et al.

It is certified that error appears in the above-identified patent and that said Letters Patent is hereby corrected as shown below:

At column 9, line 31, in Claim 1, please change "5" to --15--.

At column 10, line 15, in Claim 8, please change "B" to --E--.

At column 10, line 41, in Claim 13, please change "B" to --E--.

Signed and Sealed this

Eighth Day of December, 2009

David J. Kappos
*Director of the United States Patent and Trademark Office*